US010634327B2

(12) United States Patent
Cornell et al.

(10) Patent No.: US 10,634,327 B2
(45) Date of Patent: Apr. 28, 2020

(54) COLLAPSIBLE AREA LIGHT WITH TRIPOD

(71) Applicant: MILWAUKEE ELECTRIC TOOL CORPORATION, Brookfield, WI (US)

(72) Inventors: Brian Cornell, West Allis, WI (US); Duane W. Wenzel, Hartland, WI (US); Alan Amundson, Milwaukee, WI (US); Ross McIntyre, Milwaukee, WI (US); Jason D. Thurner, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 73 days.

(21) Appl. No.: 15/820,668

(22) Filed: Nov. 22, 2017

(65) Prior Publication Data
US 2018/0149344 A1 May 31, 2018

Related U.S. Application Data

(60) Provisional application No. 62/426,060, filed on Nov. 23, 2016.

(51) Int. Cl.
*F21V 21/30* (2006.01)
*F16M 11/28* (2006.01)
(Continued)

(52) U.S. Cl.
CPC ............. *F21V 21/30* (2013.01); *F16M 11/10* (2013.01); *F16M 11/12* (2013.01);
(Continued)

(58) Field of Classification Search
CPC ...... F16M 11/242; F16M 11/38; F16M 11/02; F16M 11/26; F16M 2200/024;
(Continued)

(56) References Cited

U.S. PATENT DOCUMENTS

| 3,526,765 A | 9/1970 | Rossi |
| 6,923,416 B1 * | 8/2005 | Hsieh ..................... F16M 11/38 |
| | | 108/118 |

(Continued)

FOREIGN PATENT DOCUMENTS

| CN | 103133967 | 6/2013 |
| KR | 20020075357 | 10/2002 |

OTHER PUBLICATIONS

International Search Report and Written Opinion for Application No. PCT/2017/062962 dated Apr. 16, 2018, 10 pages.
(Continued)

*Primary Examiner* — Anh T Mai
*Assistant Examiner* — Michael Chiang
(74) *Attorney, Agent, or Firm* — Michael Best & Friedrich LLP

(57) ABSTRACT

An area light includes a base having a first end and a second end, a pair of legs rotatably coupled to the first end of base, where the pair of legs is rotated towards the base when the light is in a stowed configuration and is rotated away from the base when the light is in an open configuration, and a light body having a light head. The light body is rotatably coupled to the base on the first end of the base, wherein the light body is rotated towards the base when the light is in the stowed configuration and is rotated away from the base when the light is in the open configuration. A light deploy mechanism couples the light body to the base. The light deploy mechanism is adjustable to move the light body between the stowed configuration and the open configuration.

7 Claims, 19 Drawing Sheets

(51) Int. Cl.

| | |
|---|---|
| *F16M 11/38* | (2006.01) |
| *F16M 11/12* | (2006.01) |
| *F21V 21/06* | (2006.01) |
| *F16M 11/10* | (2006.01) |
| *F16M 11/24* | (2006.01) |
| *F21S 6/00* | (2006.01) |
| *F21S 9/02* | (2006.01) |
| *F21V 17/00* | (2006.01) |
| *F21V 21/22* | (2006.01) |
| *F21V 23/02* | (2006.01) |
| *F21Y 115/10* | (2016.01) |
| *F16M 11/26* | (2006.01) |
| *F21W 131/10* | (2006.01) |

(52) U.S. Cl.
CPC ........... *F16M 11/242* (2013.01); *F16M 11/28* (2013.01); *F16M 11/38* (2013.01); *F21S 6/006* (2013.01); *F21S 9/02* (2013.01); *F21V 17/007* (2013.01); *F21V 21/06* (2013.01); *F21V 21/22* (2013.01); *F21V 23/023* (2013.01); *F16M 11/26* (2013.01); *F16M 2200/021* (2013.01); *F16M 2200/024* (2013.01); *F21W 2131/1005* (2013.01); *F21Y 2115/10* (2016.08)

(58) Field of Classification Search
CPC ............ F21W 2131/1005; F21V 21/26; F21V 17/007; F21M 11/28; F21M 11/38
USPC ............ 248/163.1, 166, 168, 170, 171, 169, 248/440.1, 188, 439
See application file for complete search history.

(56) References Cited

U.S. PATENT DOCUMENTS

| | | | | |
|---|---|---|---|---|
| 7,121,688 B2* | 10/2006 | Rempel | ................... | F21L 14/02 |
| | | | | 362/249.11 |
| 7,364,320 B2* | 4/2008 | Van Deursen | ......... | F16M 11/16 |
| | | | | 248/177.1 |
| 8,599,097 B2* | 12/2013 | Intravatola | ............. | F16M 11/28 |
| | | | | 343/881 |
| 9,103,495 B2 | 8/2015 | Intravatola | | |
| 9,170,006 B2 | 10/2015 | Cugini et al. | | |
| 9,303,853 B2 | 4/2016 | Deighton et al. | | |
| 2002/0094473 A1* | 7/2002 | Lin | ..................... | H01M 2/1205 |
| | | | | 429/86 |
| 2006/0086871 A1* | 4/2006 | Joseph | ................. | F16M 11/041 |
| | | | | 248/178.1 |
| 2010/0085757 A1* | 4/2010 | Barkdoll | ................. | A47F 11/10 |
| | | | | 362/282 |
| 2011/0023238 A1* | 2/2011 | Orzeck | .................... | B25F 1/003 |
| | | | | 7/118 |
| 2011/0122605 A1 | 5/2011 | Deighton et al. | | |
| 2012/0033415 A1* | 2/2012 | Sharrah | ................... | F21L 4/027 |
| | | | | 362/199 |
| 2012/0168576 A1 | 7/2012 | Intravatola | | |
| 2013/0258645 A1* | 10/2013 | Weber | ....................... | F21L 4/08 |
| | | | | 362/183 |
| 2015/0192243 A1* | 7/2015 | Sharrah | ................. | F16M 11/28 |
| | | | | 362/190 |

OTHER PUBLICATIONS

International Preliminary Report on Patentability for Application No. PCT/US2017/062962 dated Nov. 5, 2018, 28 pages.
Pelican, "9490 Remote Area Light." <https://www.pelican.com/us/en/product/remote-area-lights/9490> webpage available as early as Mar. 25, 2018, 10 pages.
Pelican, "9480 Remote Area Light." <https://www.pelican.com/us/en/product/remote-area-lights/9480> webpage available as early as Mar. 14, 2018, 10 pages.
Pelican, "Storm Cases—Waterproof Hard Case." <http://www.pelican.com/us/en/products/watertight-storm-hard-cases/> webpage available as early as Nov. 7, 2015, 10 pages.

* cited by examiner

COLLAPSIBLE AREA LIGHT WITH TRIPOD

CROSS-REFERENCE TO RELATED APPLICATIONS

The present application claims priority to U.S. Provisional Patent Application No. 62/426,060, filed Nov. 23, 2016, the entire contents of which are incorporated by reference herein.

FIELD OF INVENTION

The present invention relates to area lights, and more specifically, to compactable area lights.

BACKGROUND

Area lights are used to illuminate worksites or other areas without permanent lighting fixtures, outdoor spaces, or spaces without electricity. These worksites are often at remote locations, requiring the area lights to be transported to the worksite. Similarly, the worksites may be in a location where vehicles cannot maneuver, requiring the area light to be carried to the worksite by an operator. Many portable lights, such as hand held flashlights or small lantern style lights, are easy to carry to the worksites, but do not provide enough light to illuminate the area well enough to provide suitable working conditions. Other larger lights provide sufficient lighting to the worksite, but may be cumbersome to transport.

SUMMARY

In one construction, an area light includes a base having a first end and a second end, a pair of legs rotatably coupled to the first end of base, where the pair of legs is rotated towards the base when the light is in a stowed configuration and is rotated away from the base when the light is in an open configuration, and a light body having a light head. The light body is rotatably coupled to the base on the first end of the base. The light body is rotated towards the base when the light is in the stowed configuration and is rotated away from the base when the light is in the open configuration. A leg deployment mechanism includes an actuator and a locking mechanism. The locking mechanism is engagable with the pair of legs to selectively prohibit rotational movement of the pair of legs relative to the base. The actuator is actuable to disengage the locking mechanism such that the pair of legs is rotatable relative to the base when the actuator is actuated.

In another construction, an area light includes a base having a first end and a second end, a pair of legs rotatably coupled to the first end of base, where the pair of legs is rotated towards the base when the light is in a stowed configuration and is rotated away from the base when the light is in an open configuration, and a light body having a light head. The light body is rotatably coupled to the base on the first end of the base, wherein the light body is rotated towards the base when the light is in the stowed configuration and is rotated away from the base when the light is in the open configuration. A light deploy mechanism couples the light body to the base. The light deploy mechanism is adjustable to move the light body between the stowed configuration and the open configuration.

In another construction, an area light includes a base having a first end and a second end, a pair of legs rotatably coupled to the first end of base, wherein the pair of legs is rotated towards the base when the light is in a stowed configuration and is rotated away from the base when the light is in an open configuration, and a light body having a light head. The light body is rotatably coupled to the base on the first end of the base, where the light body is rotated towards the base when the light is in the stowed configuration and is rotated away from the base when the light is in the open configuration. A battery housing includes a receptacle for receiving a removable battery and a cover movable between an open position and a closed position, where the battery housing forms a sealed compartment when the cover is in the closed position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
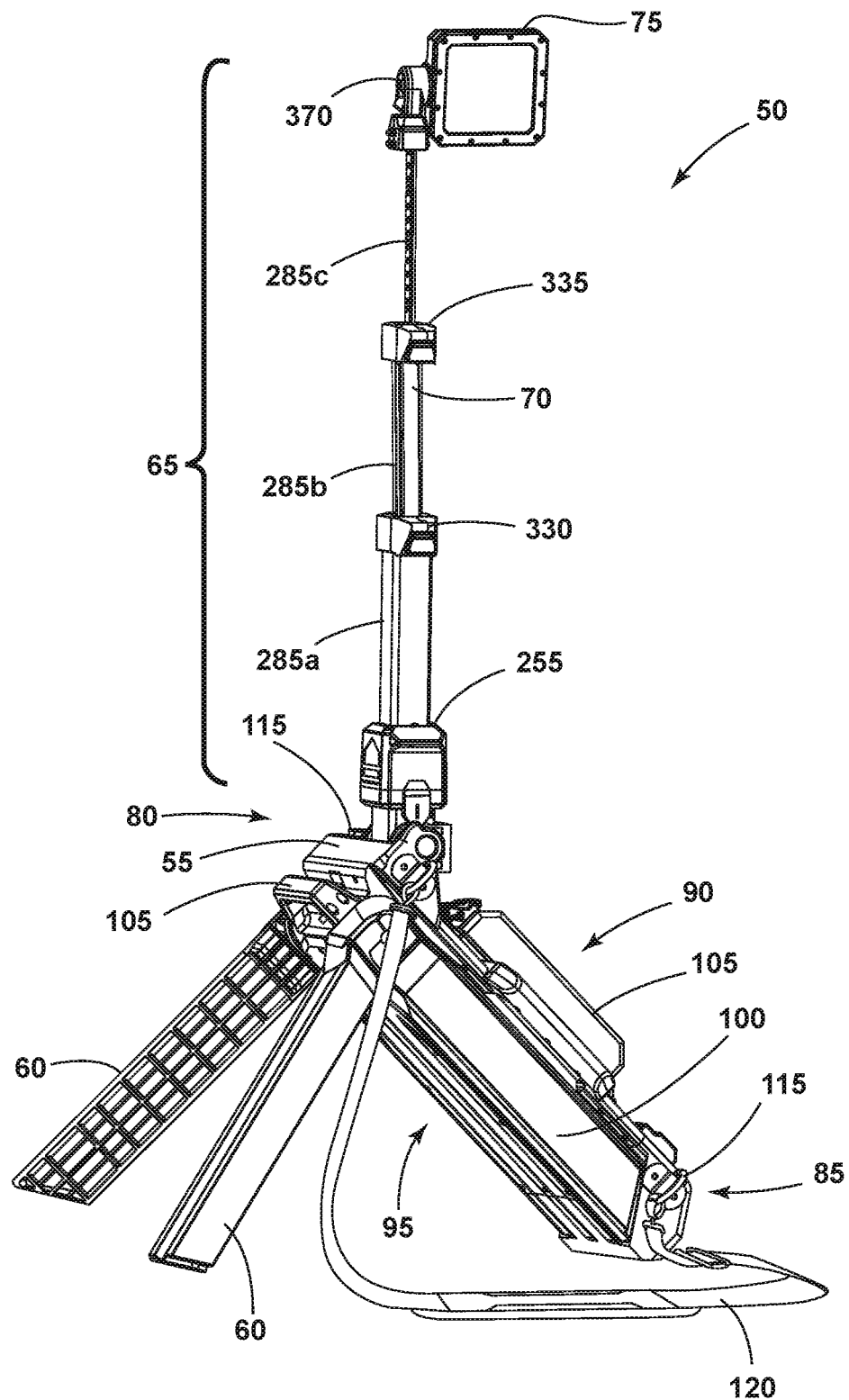
FIG. 1 is a perspective view of a light according to one embodiment, where the light is positioned in an expanded tripod configuration.
Figure 2:
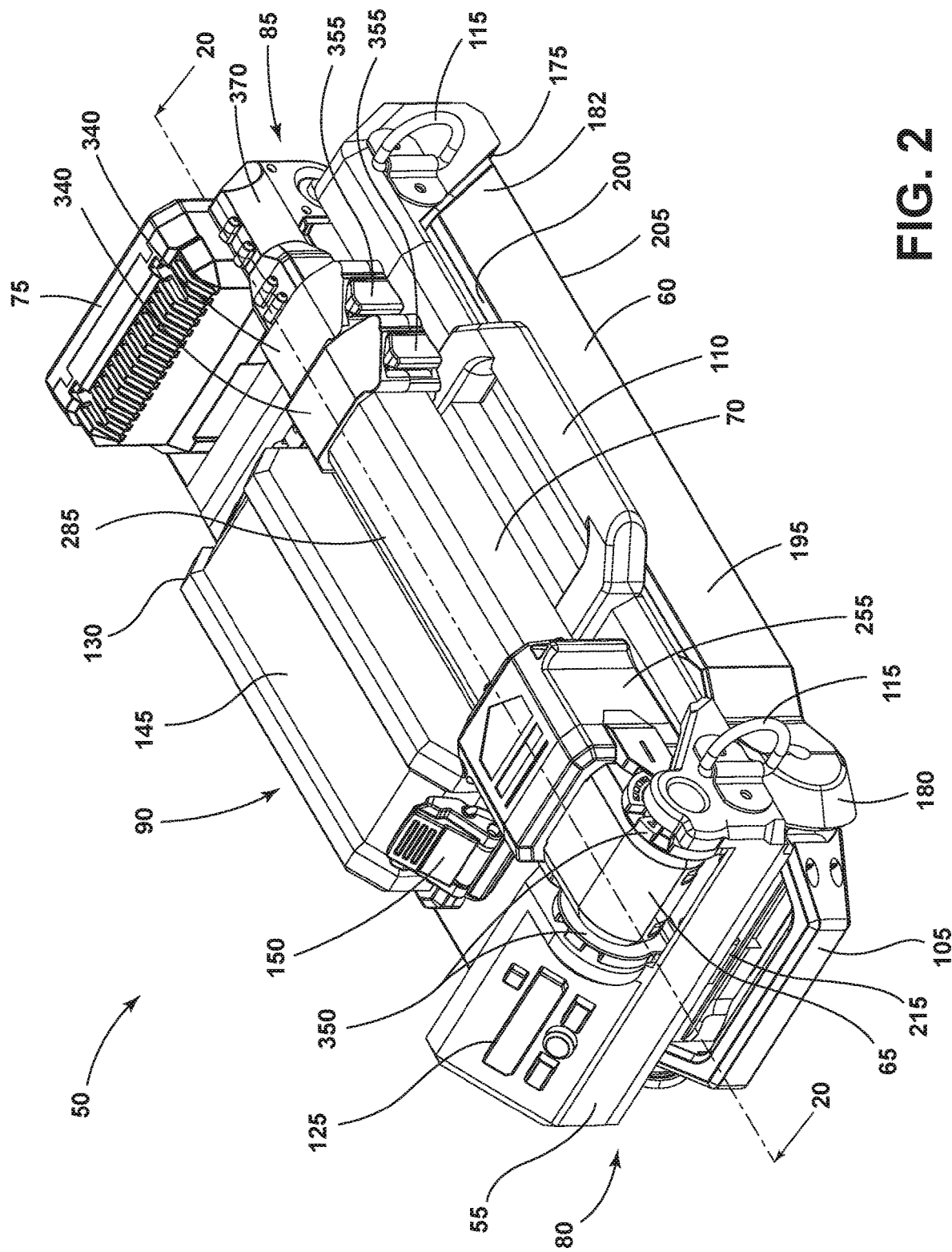
FIG. 2 is a perspective view of the light of FIG. 1 from a top end, where the light is positioned in a stowed configuration.
Figure 3:
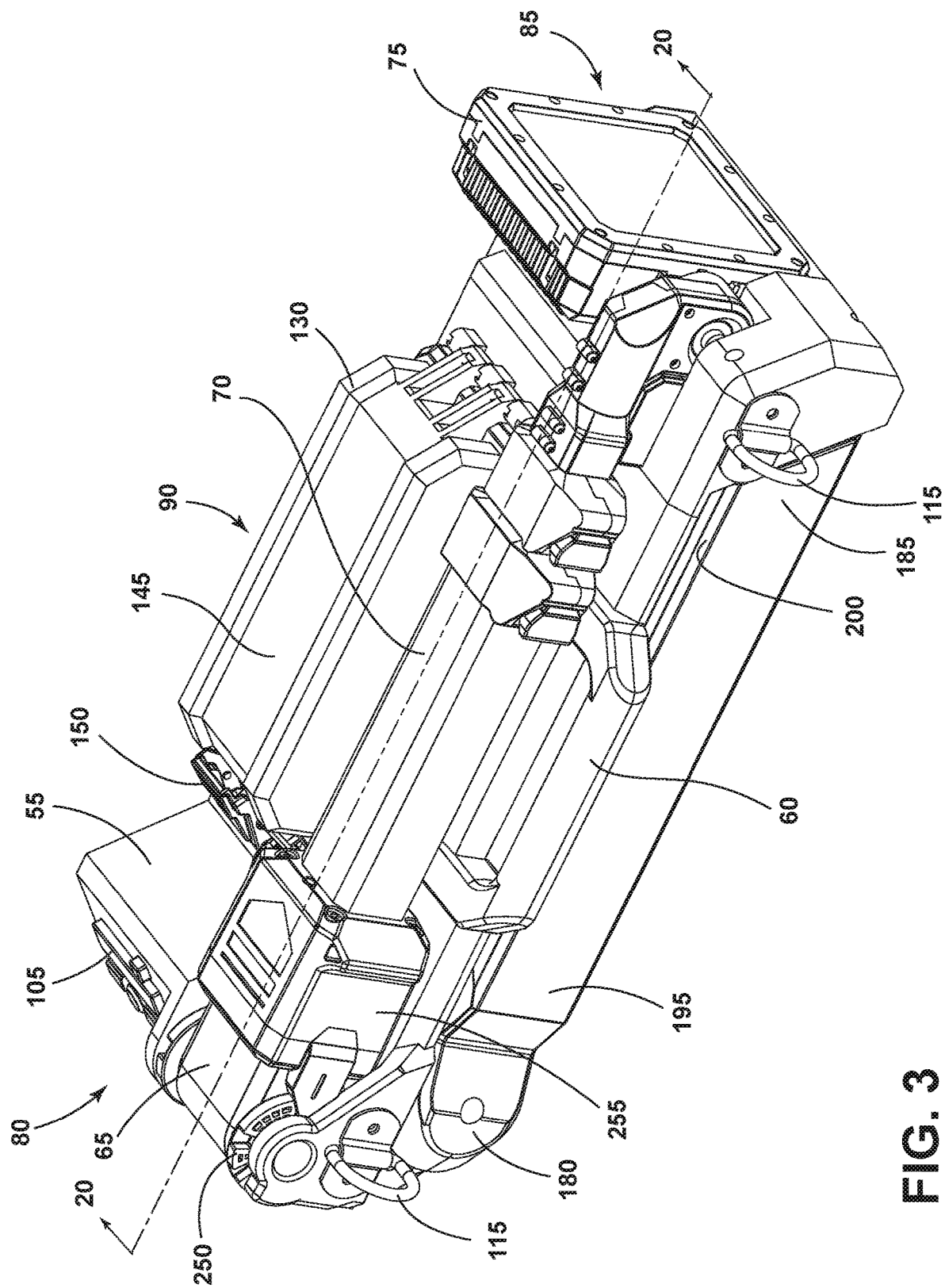
FIG. 3 is a perspective view of the light of FIG. 1 from a bottom end, where the light is positioned in the stowed configuration.

FIGS. 1-3 illustrate a light 50 including a base 55, a pair of legs 60, and a light body 65 having a mast 70 and a light head 75. The legs 60 and the light body 65 are all rotatably connected to the base 55. As will be explained in greater detail below, the light 50 can be converted between an open or expanded configuration and a stowed configuration. FIG. 1 shows the light 50 in an open configuration, and FIGS. 2-3 show the light 50 in a stowed configuration. When in the open configuration, the base 55 functions as a third leg or a support member. When in the stowed configuration, the base 55 functions as a compact carrying case.

Figure 4:
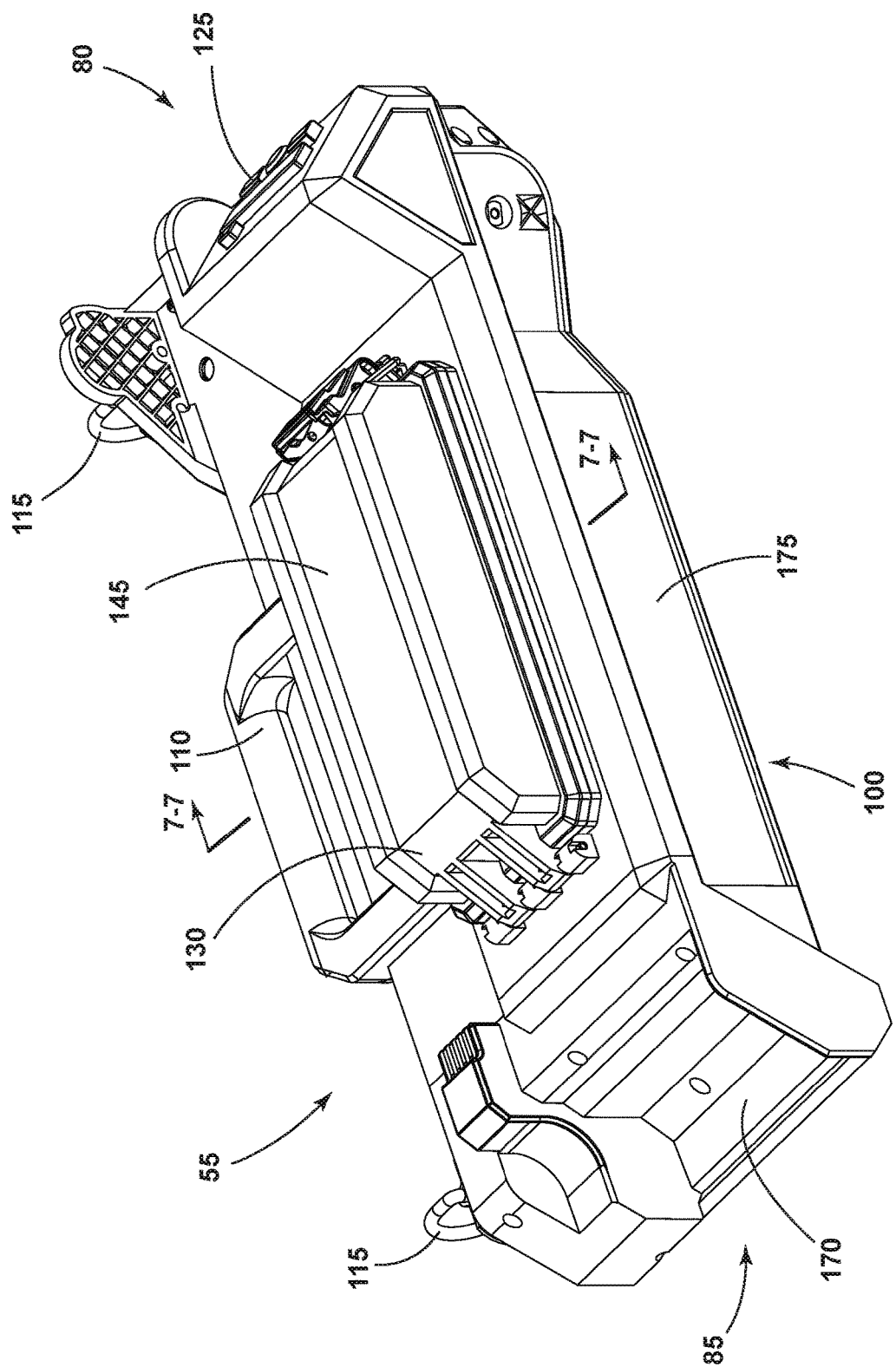
FIG. 4 is a front perspective view of the light of FIG. 1 with legs and a light body removed.
Figure 5:
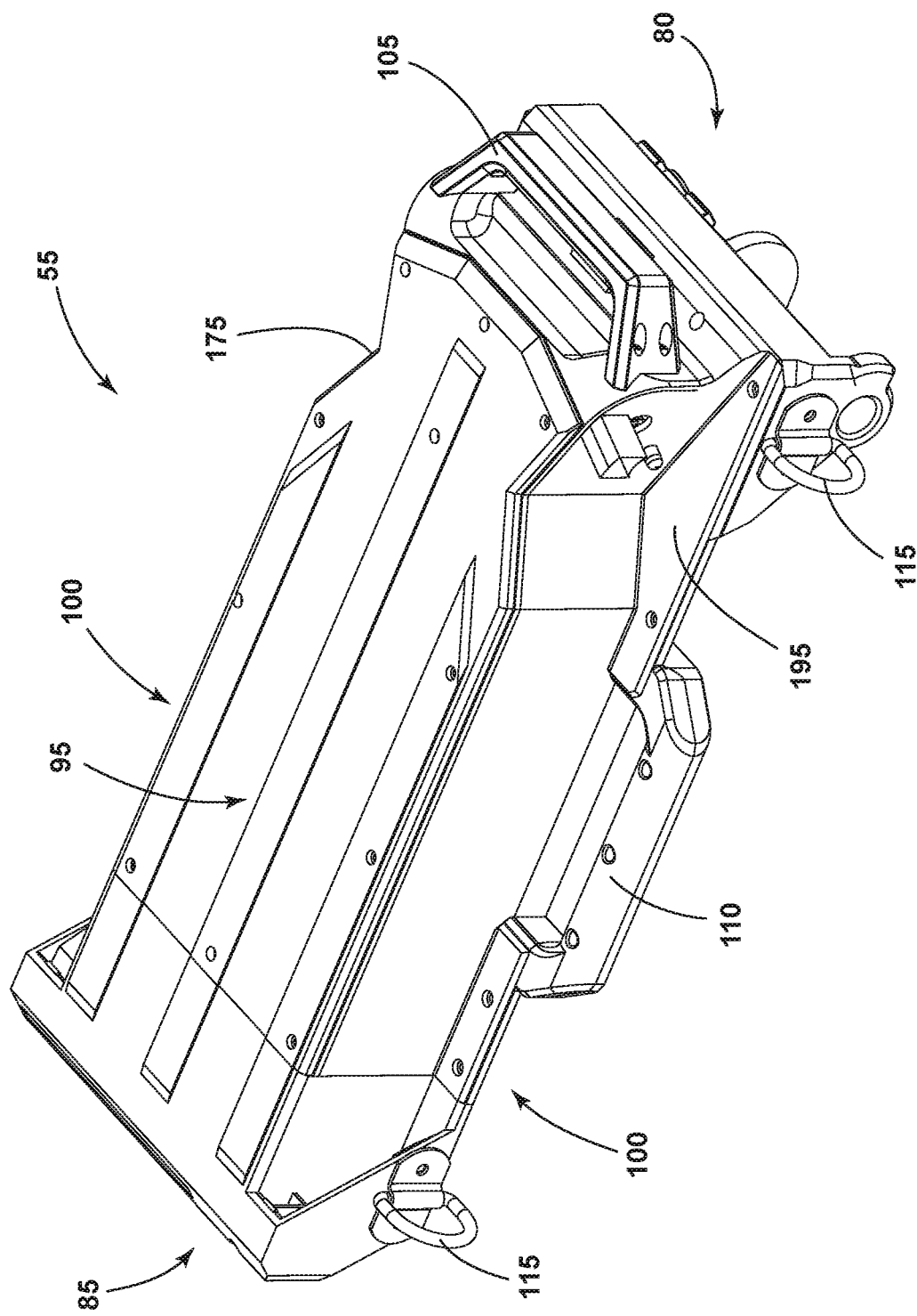
FIG. 5 is a bottom perspective view of the light of FIG. 1 with the legs and the light body removed.

FIGS. 4-5 illustrate the base 55 with the legs 60 and the light body 65 removed. The base 55 includes a top end 80, a bottom end 85, a front 90, a back 95, and two sides 100 that are spaced apart from one another. The top end 80 and the bottom end 85 are spaced apart from one another and each spans the distance between the sides 100. The front 90 and back 95 extend between the top end 80 and the bottom end 85. The base 55 includes a first handle 105 on the top end 80 of the base 55 and a second handle 110 on one of the sides 100 of the base 55. The first handle 105 enables an operator to carry the light 50 in a vertical orientation with the bottom end 85 of the light 50 facing downward. The second handle 110 enables an operator to carry the light 50 in a horizontal orientation with the side 100 opposite the second handle 110 facing downward. In the illustrated embodiment, the light 50 further includes loops 115 along one of the sides 100 of the base 55 for attaching, for example, a shoulder strap 120 to the light 50 (FIG. 1).

Additionally, the base 55 houses the electrical components (not shown) and other components of the light 50. A controller (not shown) is disposed within the base 55. A user interface 125 is positioned on the outside of the base 55 and is in communication with the controller to control the operation of the light 50. The user interface 125 can include any number of controls (real or virtual) including but not limited to a power button, a brightness control, a charge indicator, a mode adjustment button, or various other controls. In the illustrated embodiment, the user interface 125 is positioned on the top end 80 of the base 55; however, in other embodiments, the user interface 125 can be on the front 90 of the base 55, on the light body 65, or any other location accessible to an operator. In the illustrated embodiment, the user interface 125 is accessible to an operator both when the light 50 is in the open configuration and in the stowed configuration.

Figure 6:
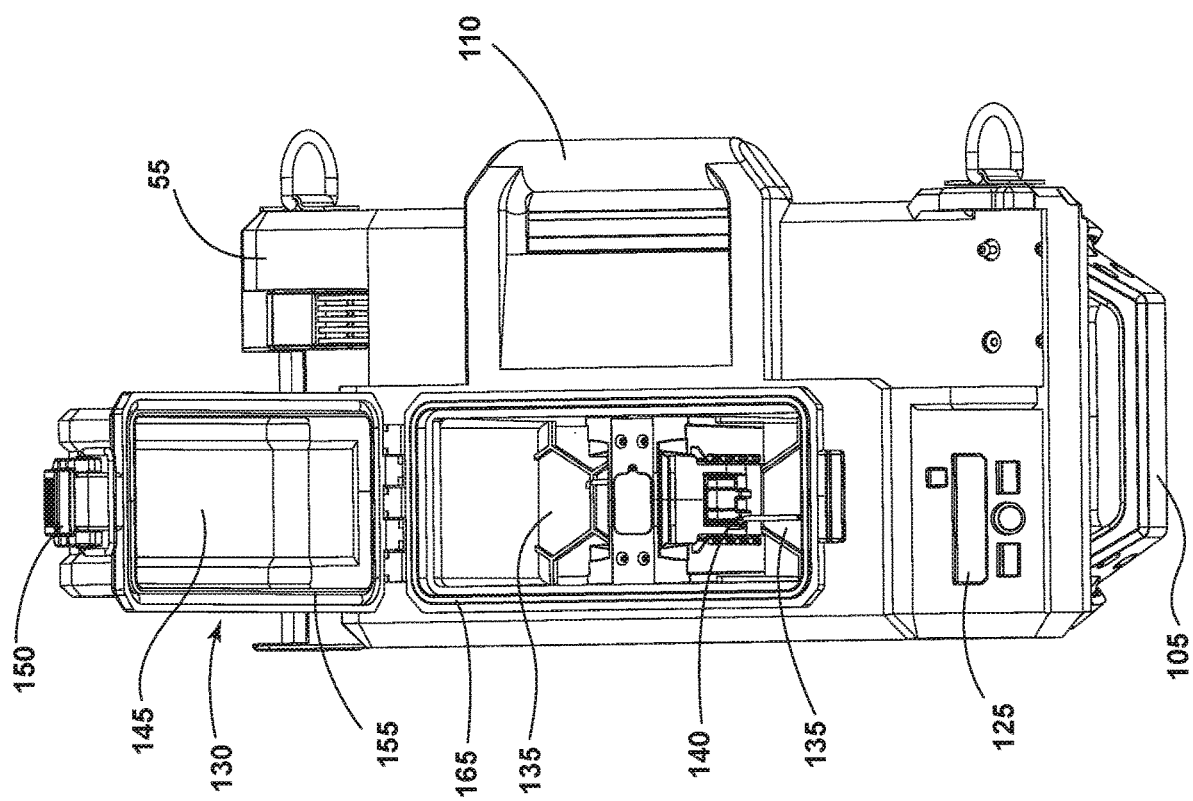
FIG. 6 is a detailed view of a battery housing of the light of FIG. 1.
Figure 7:
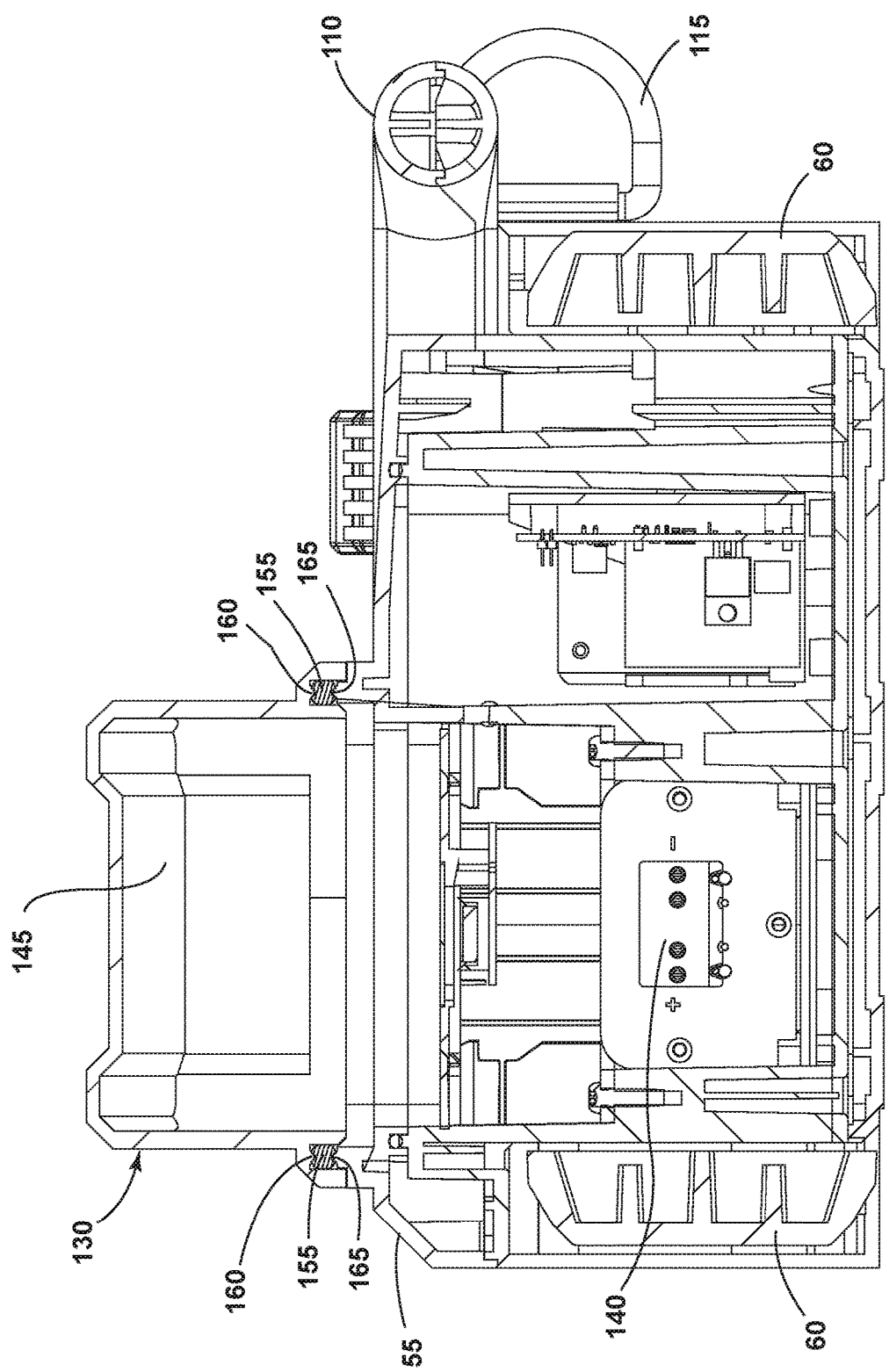
FIG. 7 is a cross-sectional view of the battery housing taken along line 7-7 of FIG. 4.

Referring to FIGS. 6-7, the base 55 also includes a battery housing 130 for receiving a battery pack (not shown). In the illustrated embodiment, the battery housing 130 is positioned on the front 90 of the base 55. In other embodiments, the battery housing 130 can be disposed in other locations, such as the bottom end 85 or the back 95 of the base 55. The battery housing 130 includes a battery receptacle 135 having electrical connections 140 for engaging with the battery and a cover 145 that can rotate between an open position and a closed position. A battery latch 150 locks the cover 145 in the closed position. In the illustrated embodiment, the battery housing 130 forms a sealed compartment when locked. Specifically, a sealing ring 155 is disposed within a recess 160 (FIG. 7) that extends around a perimeter of the cover 145. A lip 165 is formed around the perimeter of the battery receptacle 135 that aligns with the recess 160 of the cover 145. When the cover 145 is closed, the lip 165 partially extends in to the recess 160 on the cover 145 and compresses the sealing ring 155 to form an air/water tight seal. The sealing ring 155 can be composed of elastic, rubber, or another flexible material that can be compressed to seal the battery housing 130. In the illustrated construction, the battery housing 130 is arranged to receive up to two power tool battery packs as batteries. However, other constructions may include compartments arranged for different types of batteries or more or fewer batteries as may be required.

Referring back to FIGS. 2-5, the base 55 is configured to receive the light body 65 and the legs 60 when in the stowed configuration. The base 55 includes a light cradle 170 that is sized and shaped to receive the light body 65. In the illustrated embodiment, the light cradle 170 is positioned on the bottom end 85 of the base 55. Accordingly, when in the stowed configuration, the mast 70 extends along the front 90 of the base 55 between the top end 80 and the bottom end 85 and the light head 75 is received within the light cradle 170. When the light head 75 is in the stowed configuration within the light cradle 170, the light head 75 is oriented such that light emitted from a light source (not shown) within the light head 75 can be directed outwardly and away from the base 55. This enables an operator to grasp the light 50 by the second handle 110 on the side 100 of the base 55 and use the light 50 as a handheld flashlight. In other embodiments, the light cradle 170 may be positioned in a different location on the base 55 and the light head 75 may be directed in a different orientation.

In addition to the light cradle 170, the base 55 includes a leg cradle 175 for each leg 60. The leg cradles 175 are sized and shaped to receive the legs 60. The leg cradles 175 are positioned on each side 100 of the base 55. When the legs 60 are in the stowed configuration, the legs 60 fit generally within the perimeter of the base 55.

Figure 8:
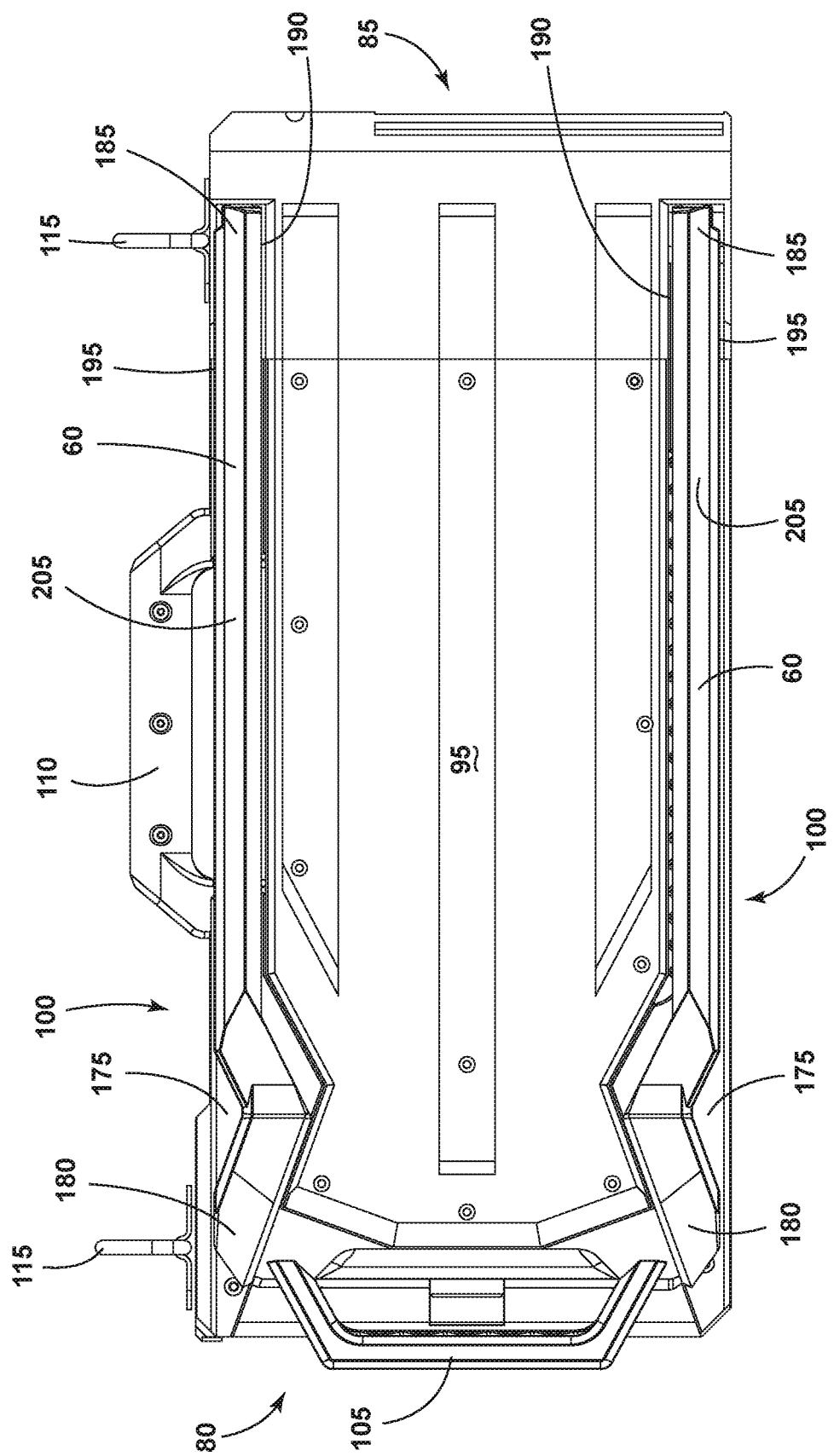
FIG. 8 is a bottom plan view of the light of FIG. 1.
Figure 9:
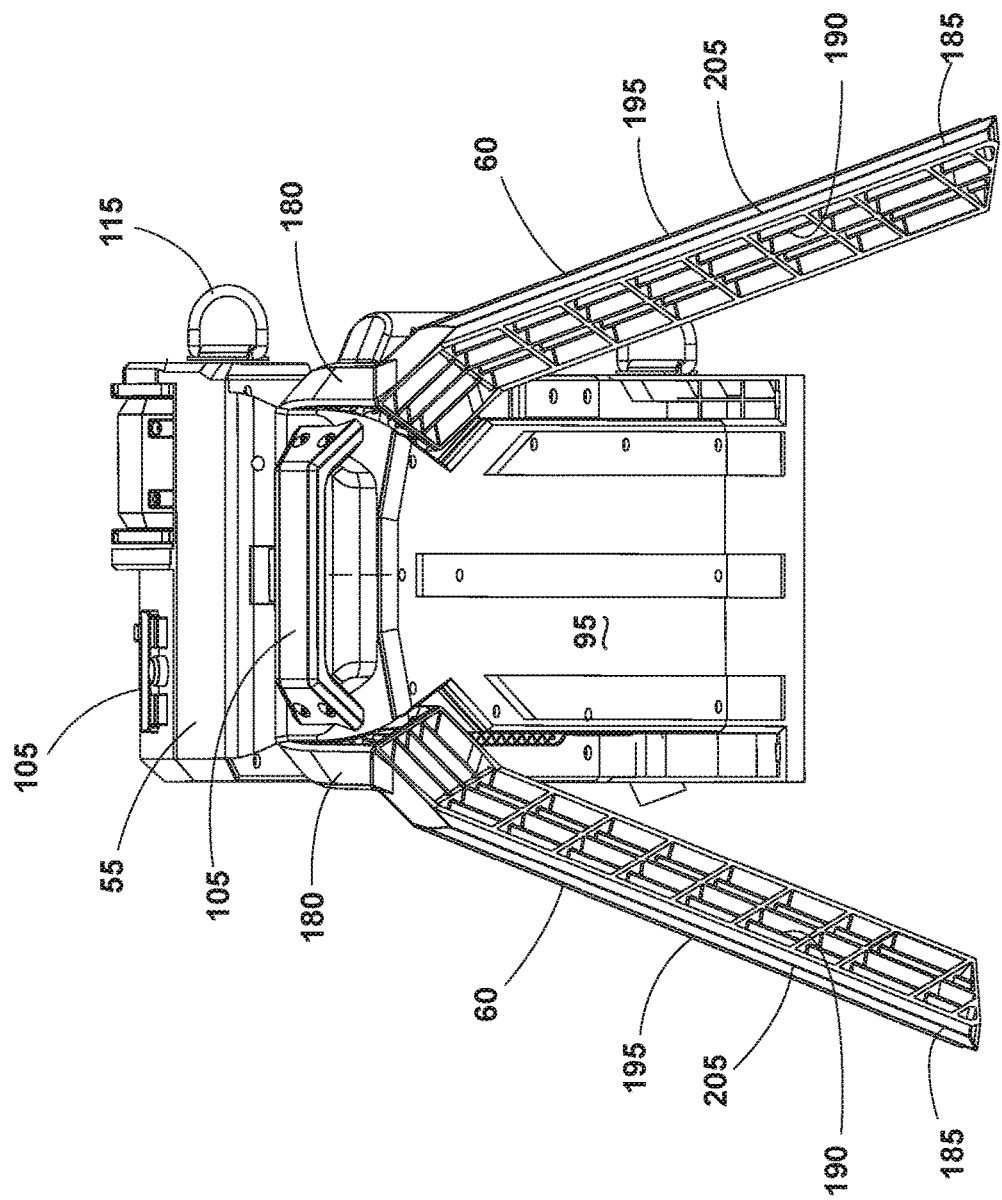
FIG. 9 is a detailed view of the legs and a base of the light in a tripod configuration.
Figure 10:
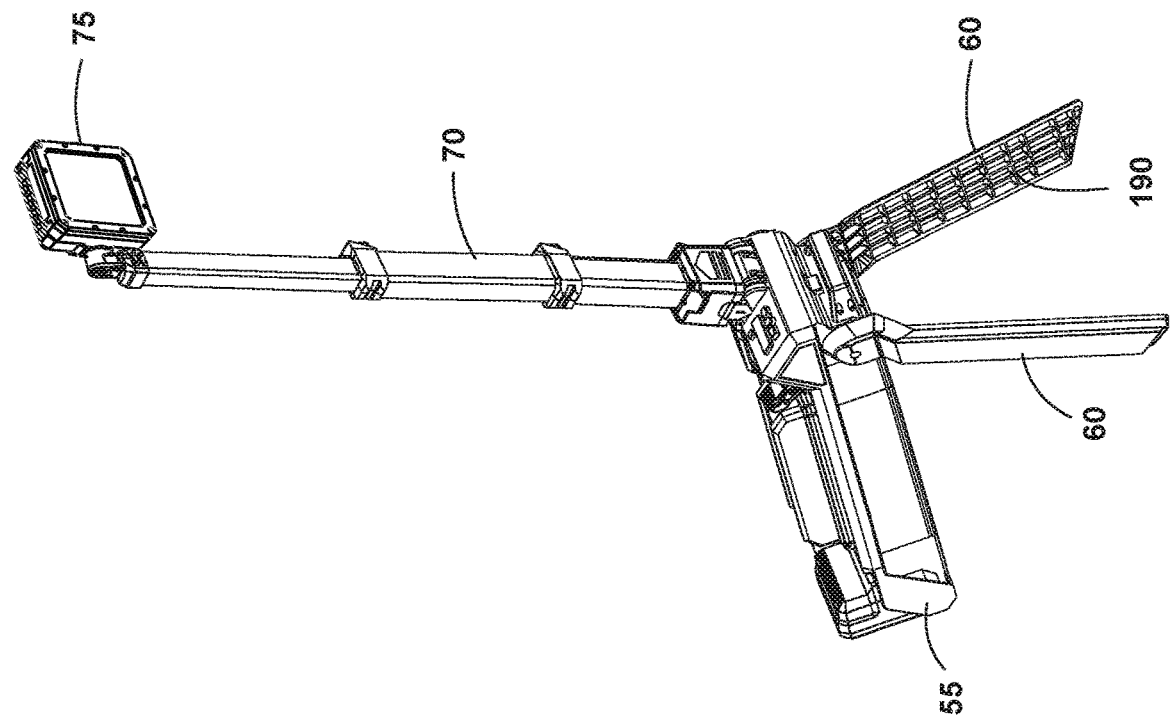
FIG. 10 is a perspective view of the light of FIG. 1 in the tripod configuration.

With reference to FIGS. 8-10, the legs 60 are elongated, and each includes a proximal end 180 that is coupled to the base 55 and a distal end 185 that is spaced apart from the proximal end 180. In the illustrated embodiment, the proximal ends 180 of the legs 60 are coupled to the sides 100 of the base 55 and are positioned closer to the top end 80 of the base 55 than the bottom end 85. The distal ends 185 can rotate towards and away from the base 55 to convert between the stowed configuration and the open configuration. The distal ends 185 of the legs 60 form the feet of the light 50 when in certain open configurations. Each leg 60 further includes an inside surface 190 and an outside surface 195 that extend between the proximal end 180 and the distal end 185. When in the stowed configuration, the inside surface 190 of each leg 60 faces towards the sides 100 of the base 55 and the outside surface 195 of each leg 60 faces away from the sides 100 of the base 55. Similarly, each leg 60 includes a first edge 200 (FIG. 14) and a second edge 205 that extend between the proximal end 180 and the distal end 185. When in the stowed configuration the first edge 200 faces towards the front 90 of the base 55 and the second edge 205 faces towards the back 95 of the base 55.

The legs 60 are rotatably connected to the base 55 so that they can be rotated between the stowed configuration where the legs 60 are received in the leg cradles 175 and the open configuration where the distal ends 185 of the legs 60 are rotated away from the base 55. When in the stowed configuration, as shown in FIG. 8, the legs 60 are received within the leg cradles 175 and are generally parallel to one another. In this position, the legs 60 are substantially recessed within the perimeter of the base 55 to form a compact light. As shown in FIGS. 9-10, when the legs 60 are rotated to the open configuration, the legs 60 are oriented at an angle relative to one another. In other words, the proximal ends 180 of the legs 60 are closer together than the distal ends 185.

Figure 11:
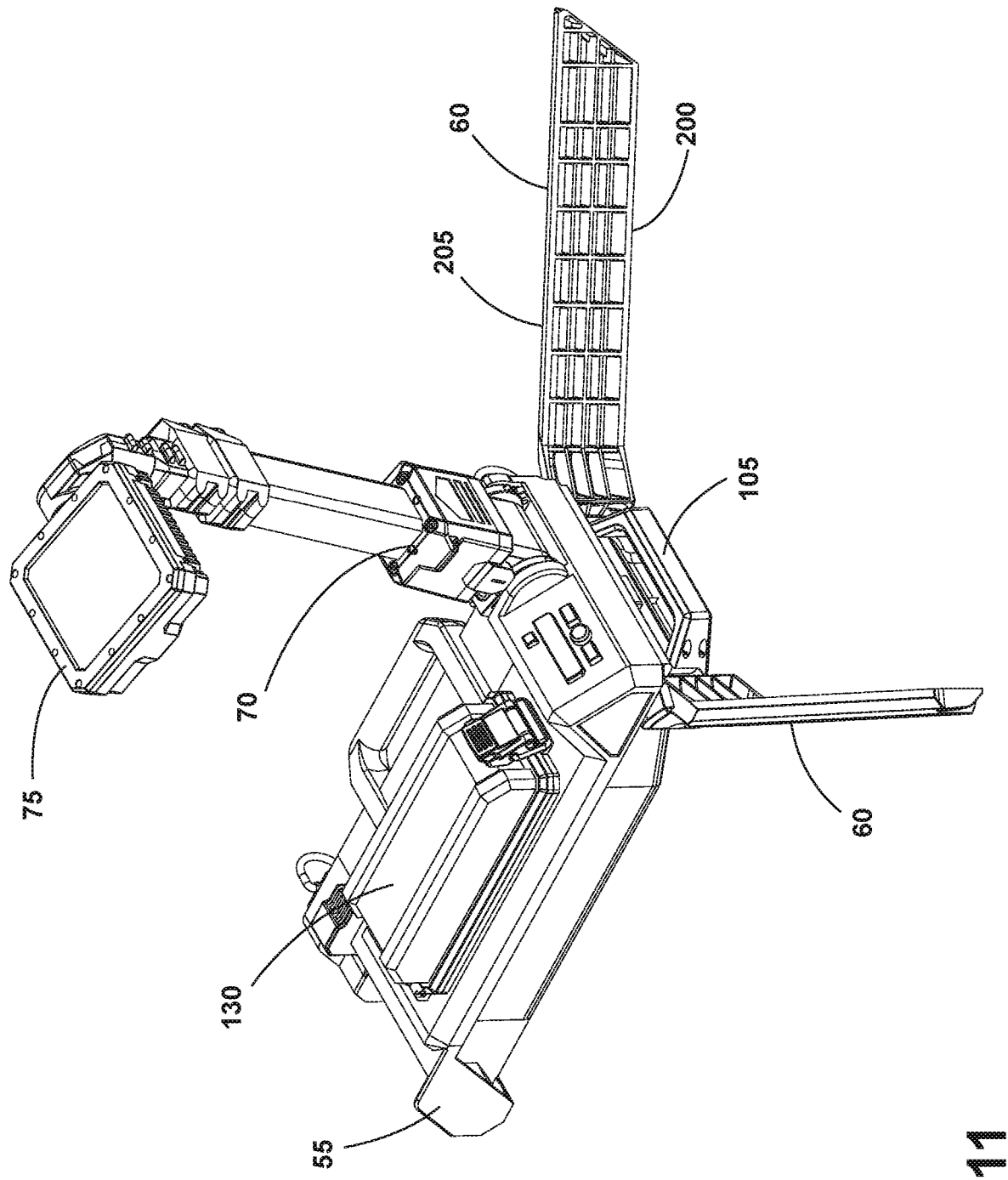
FIG. 11 is a perspective view of the light of FIG. 1 in a platform configuration.
Figure 12:
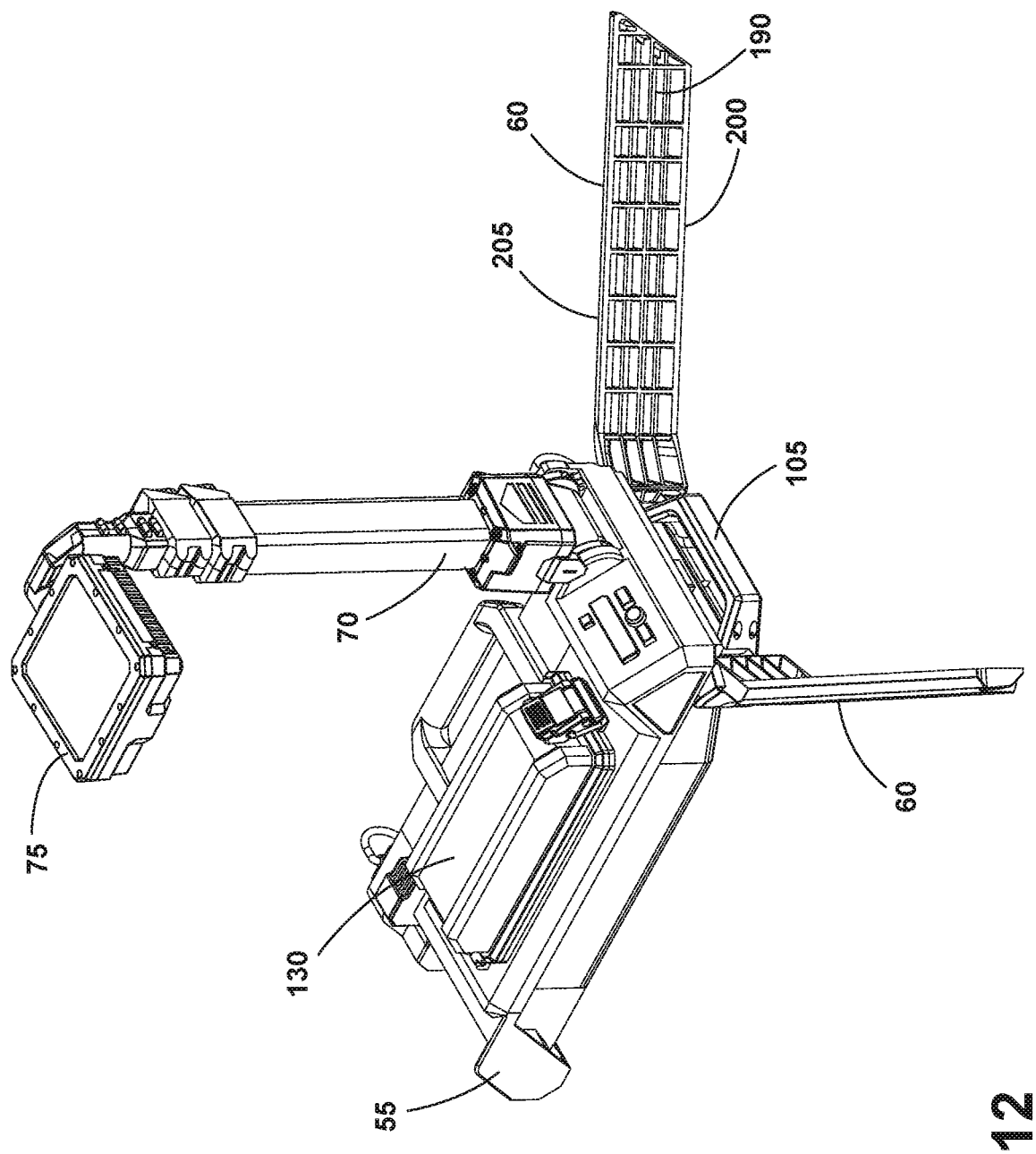
FIG. 12 is another perspective view of the light of FIG. 1 in the platform configuration.

With reference to FIGS. 9-12, when the legs 60 are in the open configuration, the base 55 and the legs 60 can form at least two different support configurations for supporting the light body 65. In FIGS. 9-10, the legs 60 and the base 55 are in a tripod configuration. In this configuration, the distal ends 185 of the legs 60 function as feet that contact the ground. The feet are angled to provide better contact with the ground. The base 55 forms the third leg 60 in the tripod with the bottom end 85 contacting the ground. The legs 60 and base 55 are upright in the tripod configuration. In FIGS. 11-12, the legs 60 and the base 55 are in a platform configuration. Specifically, in the illustrated embodiment, the legs 60 and the base 55 form a Y-shaped platform. In this configuration, the back 95 of the base 55 and the first edges 200 of the legs 60 contact the ground. The base 55 and the legs 60 are in a downward or flat position when in the platform configuration.

Figure 13:
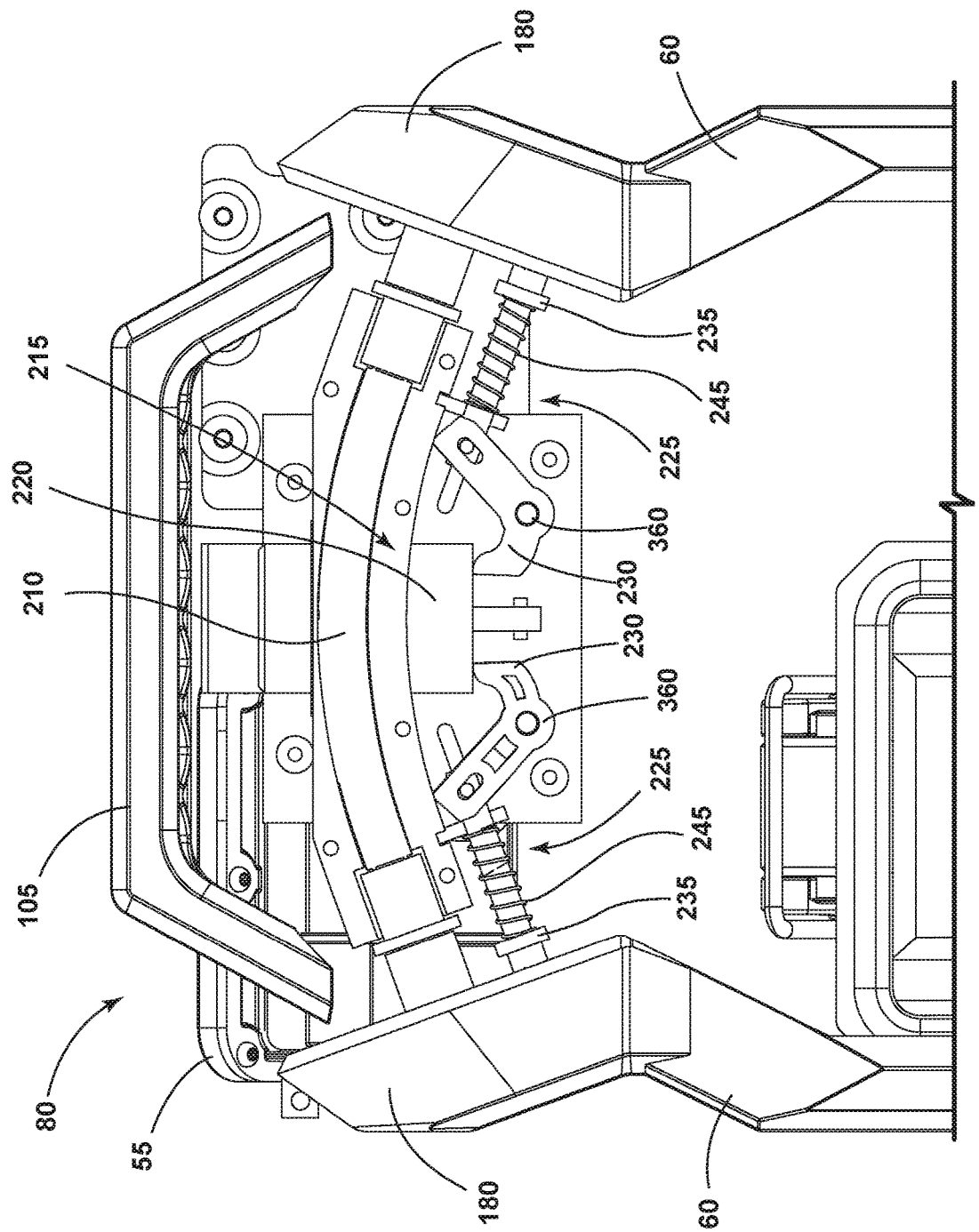
FIG. 13 is an enlarged view of the light of FIG. 1 with a bottom removed to reveal a leg deploy mechanism.

FIG. 13 shows the light 50 with the back 95 of the base 55 removed to reveal some of the working parts within the base 55 that control the movement of the legs 60. In the illustrated embodiment, the legs 60 are attached to one another by a connector 210. In the illustrated embodiment, the connector 210 is a tubular body that extends through the base 55 and couples the legs 60 together. In addition, in the illustrated embodiment, the connector 210 is flexible to allow for adjustment of the legs 60. The connector 210 is fixedly attached to the proximal ends 180 of the legs 60 at pivot points 360 about which the legs 60 rotate. The connector 210 enables the legs 60 to rotate together as a single unit so that when one of the legs 60 is rotated the other leg 60 will also rotate.

With continued reference to FIG. 13, a leg deploy mechanism 215 is used to lock the legs 60 in different positions relative to the base 55. The leg deploy mechanism 215 includes an actuator 220 and a locking mechanism 225. In the illustrated embodiment, there are two locking mechanisms 225, one corresponding to each leg 60, and one actuator 220 that releases both locking mechanisms 225 simultaneously. In other embodiments, the leg deploy mechanism 215 may include a separate actuator 220 and locking mechanism 225 for each leg 60.

The locking mechanisms 225 each include a pivotable member 230 and a pin 235 that engages with the leg 60. Specifically, the pins 235 engage with bores 240 (FIG. 14) in the legs 60 to secure the legs 60 from rotating. The pins 235 are biased towards a locked position where the pins 235 are received within the bores 240. In the illustrated embodiment, the pins 235 are biased towards the locked position by springs 245, however, other biasing mechanisms can be used. The pivotable members 230 are rotatably coupled to the base 55. The pivotable members 230 are also rotatably coupled to the pins 235. Rotation of the pivotable members 230 relative to the base 55 moves the pins 235 against the biasing force of the springs 245 so that the pins 235 are removed from the bores 240 in the legs 60. The actuator 220 can be actuated to rotate the pivotable members 230 and release the pins 235 from the bores 240 to unlock the legs 60. When the actuator 220 is actuated, the legs 60 can rotate freely relative to the base 55. When the actuator 220 is released, the springs 245 bias the locking mechanisms 225 towards the locked position.

Figure 14:
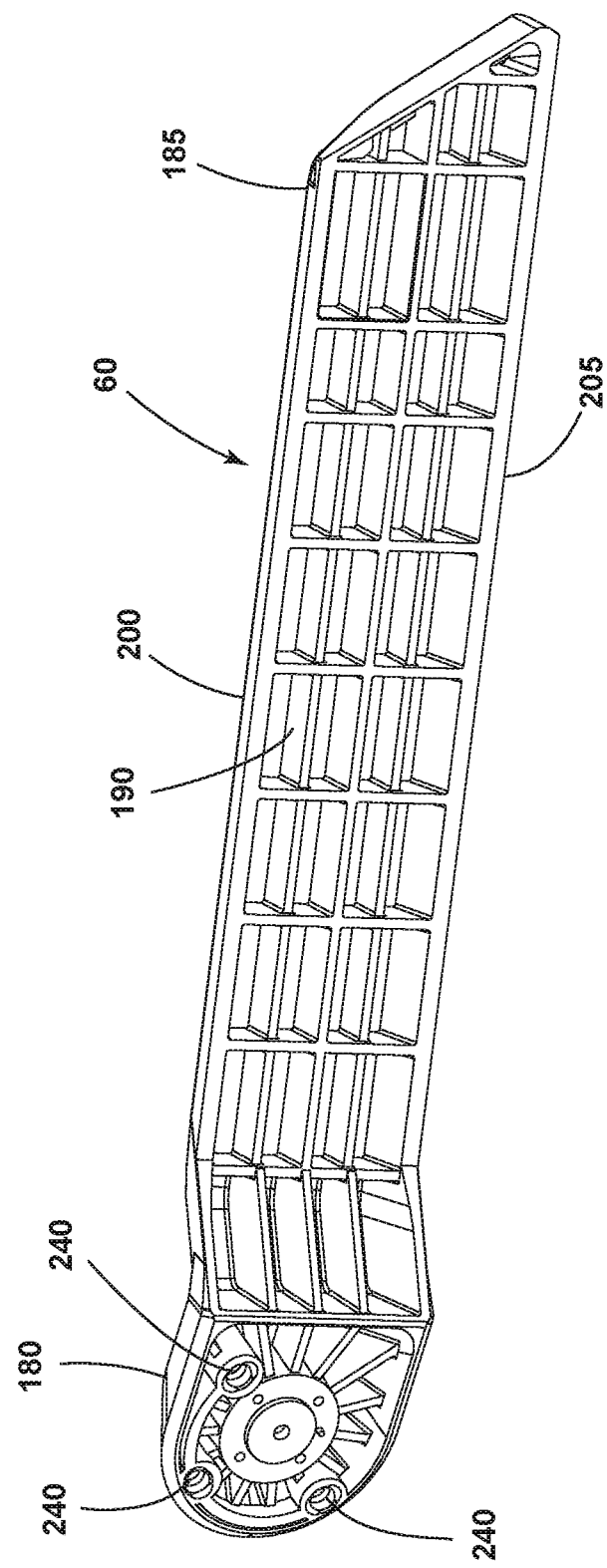
FIG. 14 is a perspective view of one of the legs.

As shown in FIG. 14, each leg 60 may include multiple bores 240 to help maintain the legs 60 at different angles relative to the base 55. In the illustrated embodiment, the legs 60 include three bores 240 corresponding to the stowed configuration, the tripod configuration, and the platform configuration. For example, when the pins 235 are engaged with the bore 240 corresponding to the stowed configuration, the legs 60 are locked in the leg cradles 175 of the base 55 to maintain the legs 60 in the stowed configuration so that they cannot rotate towards the open configurations. Likewise, the other bores 240 can maintain the legs 60 in the open configuration so that the legs 60 do not collapse, for example, when in the tripod configuration.

Figure 15:
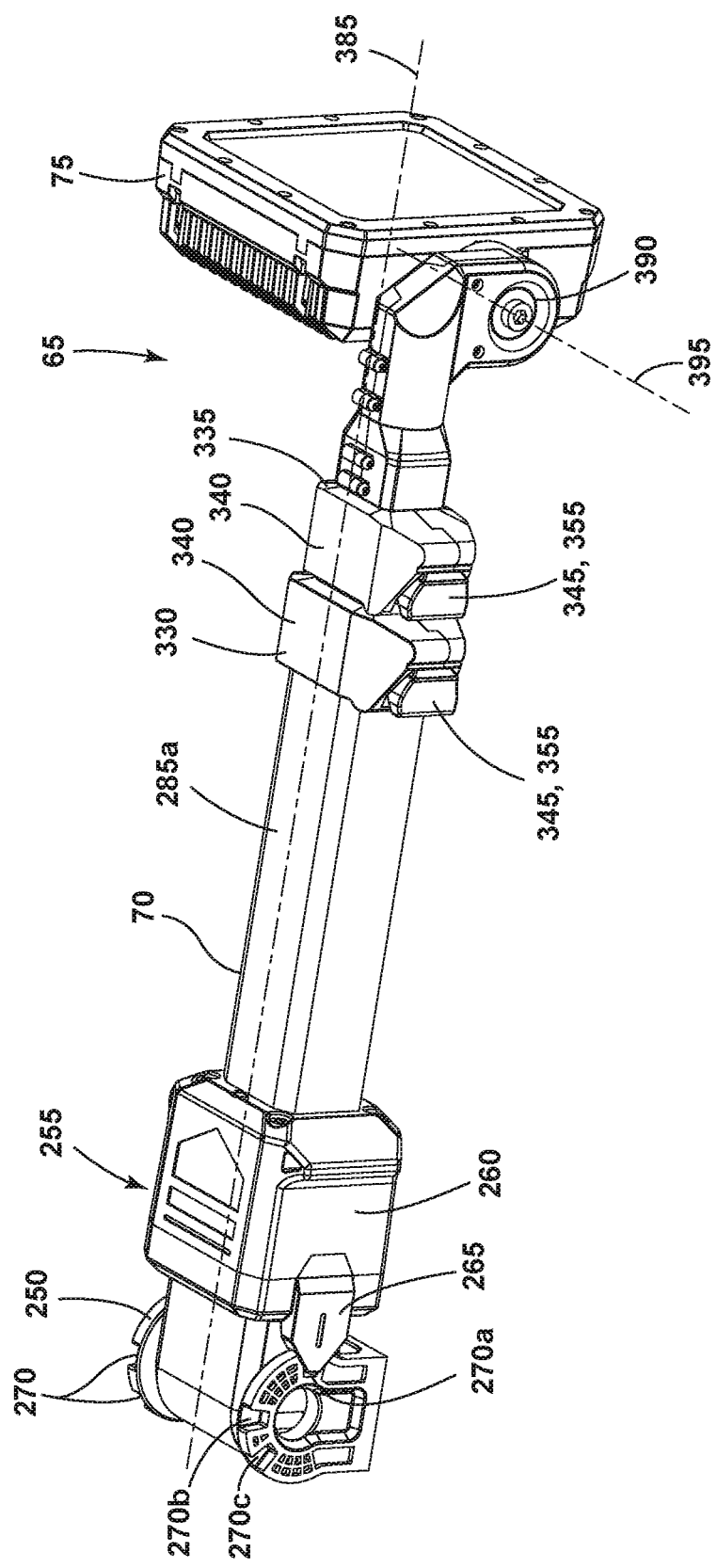
FIG. 15 is a perspective view of the light body.
Figure 16:
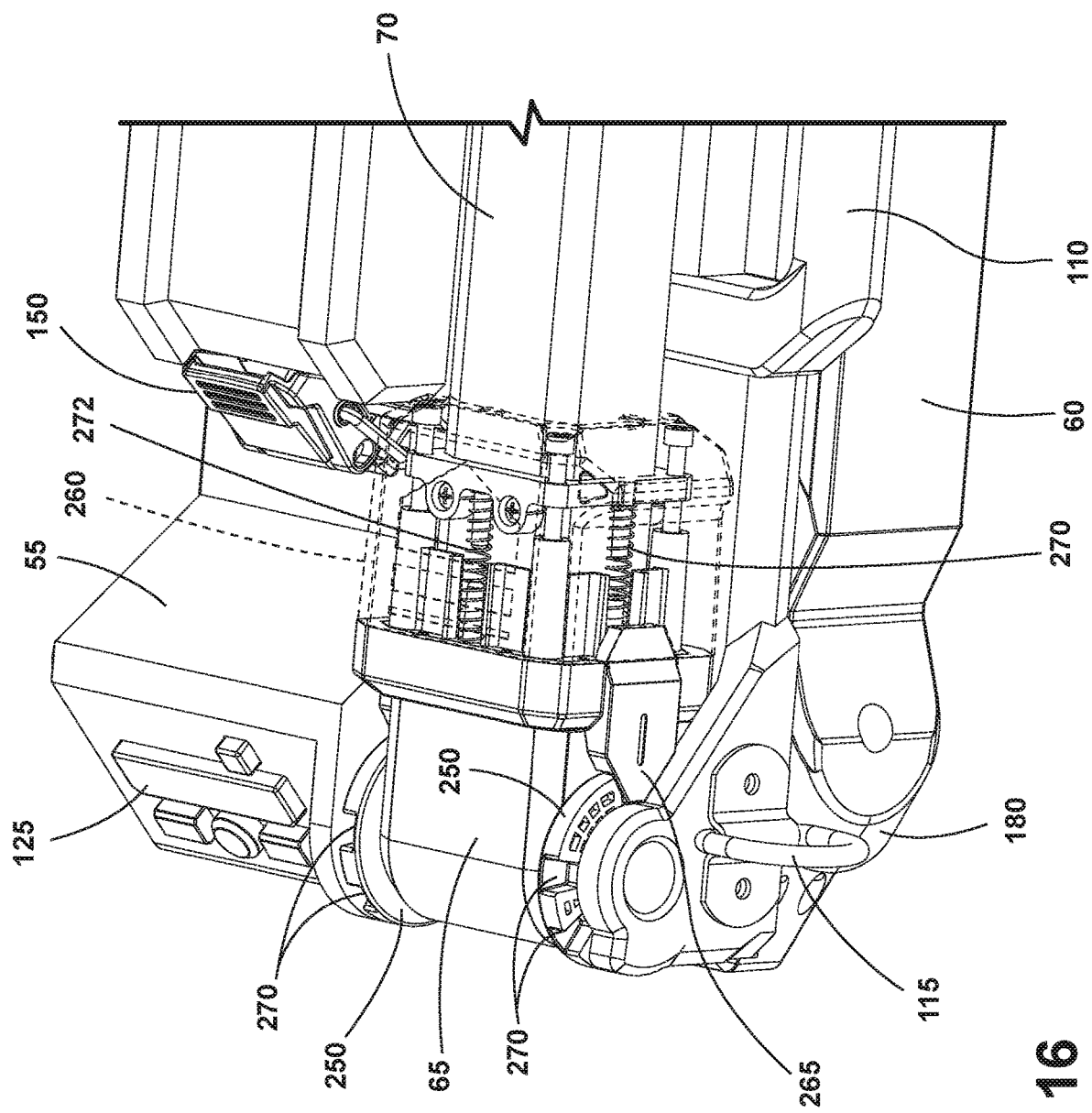
FIG. 16 is a detailed view of a light deploy mechanism.

Referring to FIGS. 15-16, the light body 65 is also capable of rotating between multiple positions relative to the base 55. The light body 65 is rotatably connected to the top end 80 of the base 55 by a rotational light deploy mechanism 255. The position of the light body 65 is controlled by the light deploy mechanism 255. The light deploy mechanism 255 includes a sleeve 260 that can slide linearly along the light body 65 and a rotational coupling 250 having a plurality of notches 270. The sleeve 260 includes a hook 265 that can engage with the notches 270 in the rotational coupling 250. When the hook 265 is engaged with one of the notches 270, the light body 65 cannot rotate relative to the base 55. The rotational coupling 250 includes multiple notches 270 corresponding to different positions of the light body 65 relative to the base 55. A first notch 270a locks the light body 65 in the stowed configuration with the light head 75 in the light cradle 170. Other notches 270 can maintain the light body 65 at a certain angle relative to the body so that the light body 65 remains vertical when the base 55 and the legs 60 are in the one of the open configurations. For example, as shown in FIG. 12, a second notch 270b (FIG. 15) maintains the legs 60 and the base 55 are in the platform configuration. In this configuration, the light body 65 is maintained at a perpendicular angle relative to the base 55. Referring to FIG. 11, a third notch 270c (FIG. 15) locks the legs 60 and base 55 in the tripod configuration. In this configuration, the light body 65 is maintained at an obtuse angle relative to the base 55.

In some embodiments, to adjust the light body 65 between different positions, the sleeve 260 can be slid axially along the light body 65 until the hook 265 disengages with the notches 270. When the hook 265 is disengaged from the notches 270, the light body 65 can be freely rotated relative to the base 55. As shown in FIG. 16, the sleeve 260 is biased towards a locked position so that the hook 265 engages a notch 270. In the illustrated embodiment, the sleeve 260 is biased by springs 272 that push the sleeve 260 towards the rotational coupling 250. An operator can slide the sleeve 260 away from the rotational coupling 250 against the spring force to release the hook 265 from the notch 270. Once the hook 265 is disengaged, the light body 65 can be rotated to a different position so that the hook 265 aligns with a different notch 270. Once the sleeve 260 is released, the springs 272 will bias the sleeve 260 towards the rotational coupling 250 so that the hook 265 engages the notches 270.

In other embodiments, a user is not required to slide the sleeve 260 axially along the light body 65 to disengage the hook 265 from the notches 270. Rather, a user can simply pull on the light body 65 to rotate it away from the base 55. For example, a user can "throw" the light body 65 away from the base 55 and the hook 265 will automatically engage with one of the notches 270 due to the spring bias of the sleeve 260 towards a locked position. This feature allows for quick deployment of the light body 65 with a single motion.

Figure 20:
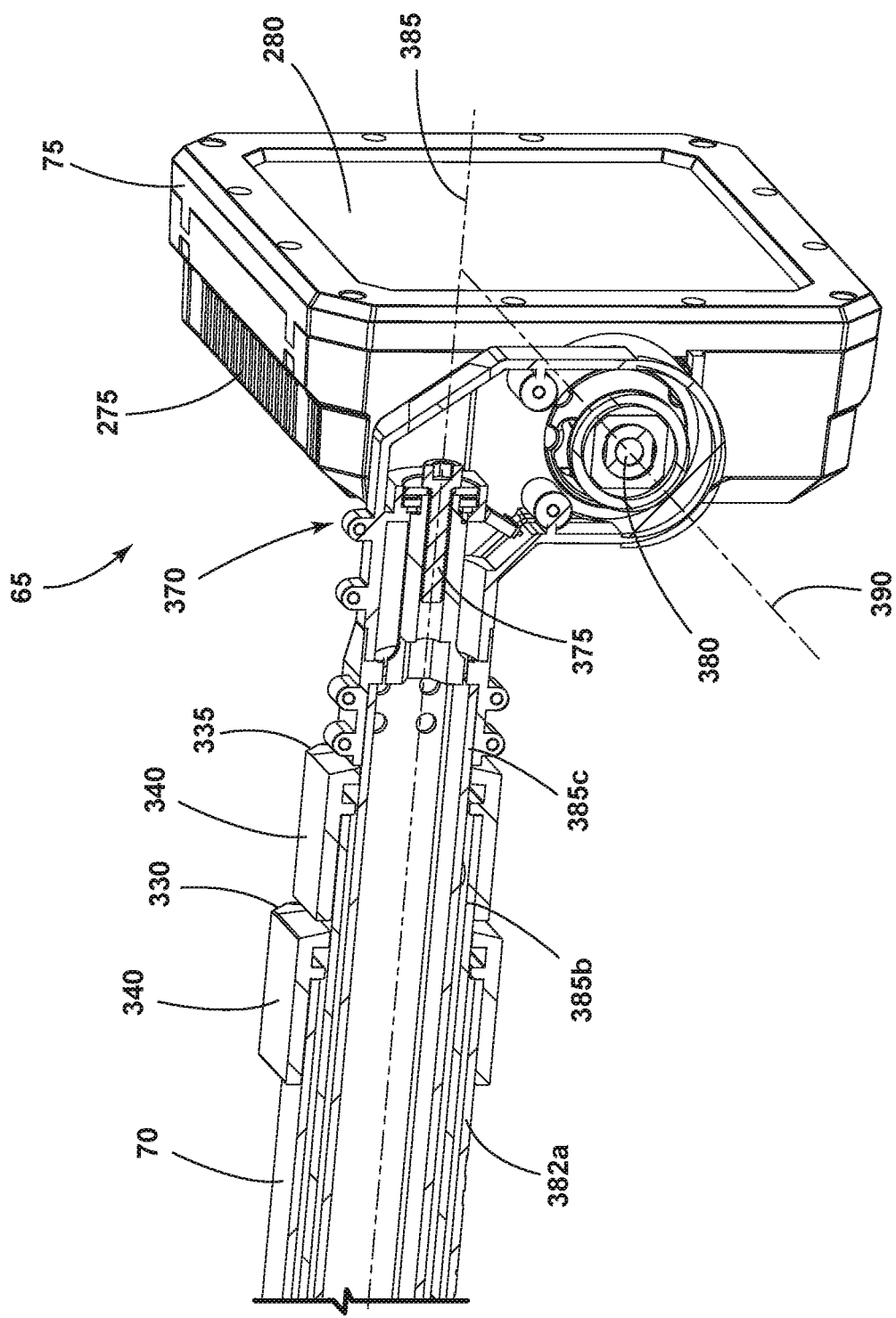
FIG. 20 is a cross-sectional view of a hinge assembly.

As previously mentioned, the light body 65 includes the mast 70 and the light head 75. The light head 75 includes a light source (not shown, but preferably LEDs), a heat sink 275 (FIG. 17), and a lens 280 (FIG. 20). In the illustrated embodiment, the mast 70 is a telescoping mast including a plurality of telescoping members 285 that can be extended (FIG. 1) and retracted (FIG. 15) to create different mast heights. The illustrated embodiment includes three elongated telescoping members 285. As shown in FIG. 1, the first telescoping member 285a is rotatably coupled to the base 55, the third telescoping member 285c is coupled to the light head 75, and the second telescoping member 285b connects the first telescoping member 285a and the third telescoping member.

Figure 17:
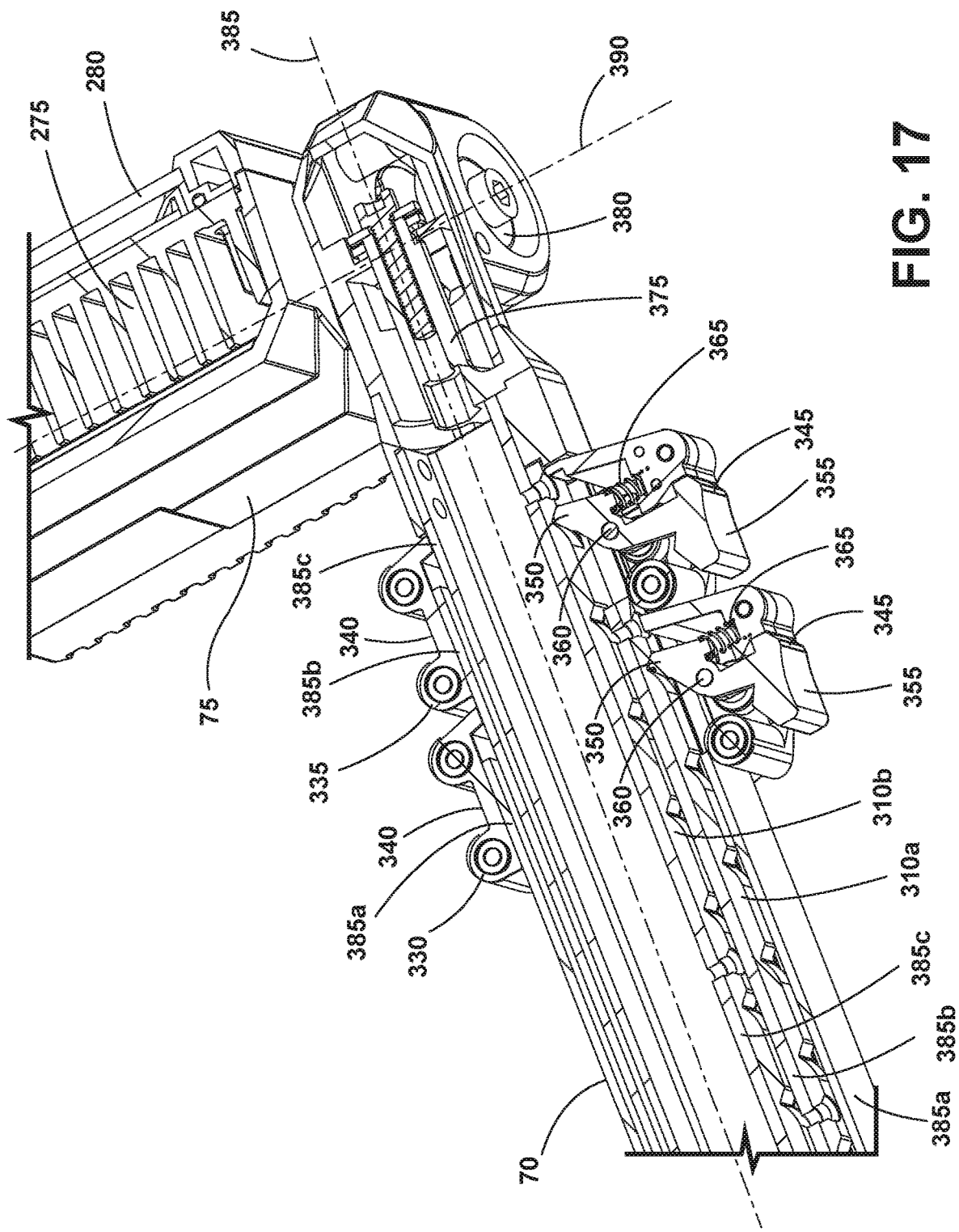
FIG. 17 is a cross-sectional view of a light adjustment mechanism.

The telescoping members 285 can be stowed concentrically to one another into a compact configuration, as shown in the cross-sectional view of FIG. 17. The third telescoping member 285c extends within a hollow portion of the second telescoping member 285b, and the second telescoping member 285b extends within a hollow portion of the first telescoping member 285a. The telescoping members 285 can translate in an axial direction relative to one another. The second telescoping member 285b and the third telescoping member 285c include a channel 305 (shown in FIG. 18) that is sized and shaped to receive a detent member 310. FIG. 19 illustrates two examples of detent members 310. The detent member 310 is an elongated plate that includes a plurality of detents 325. In the illustrated embodiment, the telescoping members 285 and the detent members 310 are separate elements. However, in other embodiments, the detents 325 are formed directly within the telescoping member 285.

Figure 18:
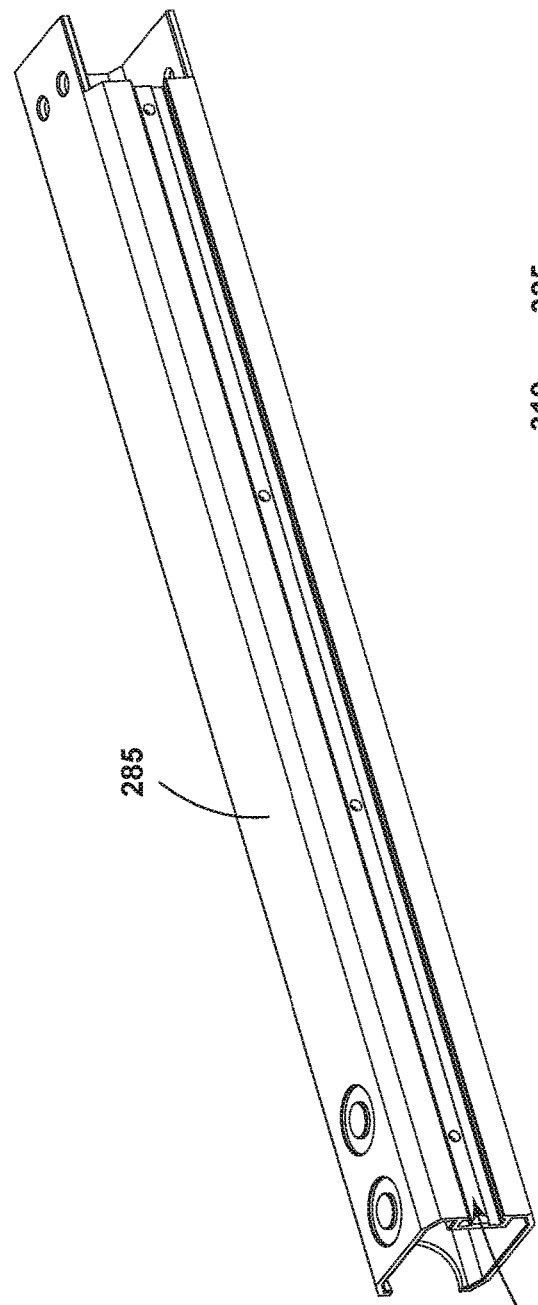
FIG. 18 is a perspective view of a telescoping member.
Figure 19:
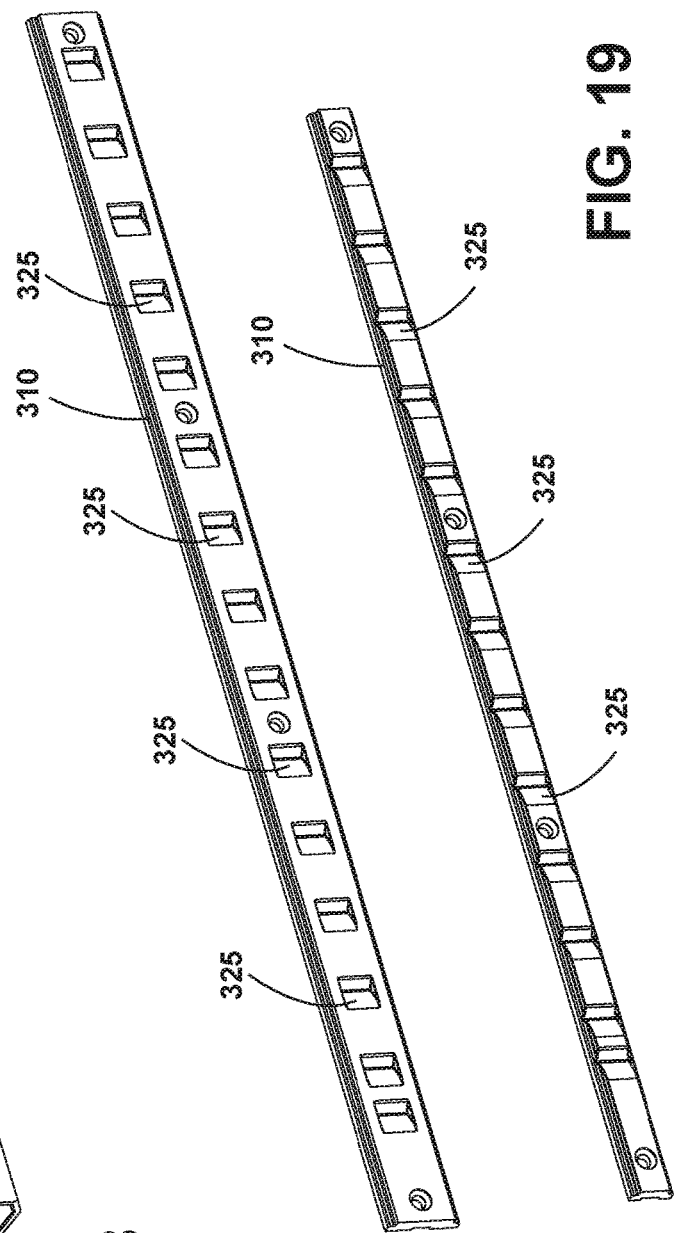
FIG. 19 is a perspective view of a pair of detent members.

With continued reference to FIGS. 17-19, the first telescoping member 285a includes a first adjustment mechanism 330 that can adjust the position of the second telescoping member 285b relative to the first telescoping member 285a. More specifically, the first adjustment mechanism 330 is coupled to the first telescoping member 285a and engages with a first detent member 310a disposed within the channel 305 of the second telescoping member 285b. Similarly, the second telescoping member 285b includes a second adjustment mechanism 335 that can adjust the position of the third telescoping member 285c relative to the second telescoping member 285b. The second adjustment mechanism 335 is coupled to the second telescoping member 285b and engages with a second detent member 310b disposed within a channel 305 in the third telescoping member 285c. In some embodiments, the first and second adjustment mechanisms 335 engage directly with detents 325 in the telescoping members 285 rather than with the detent members 310.

The first adjustment mechanism 330 and the second adjustment mechanism 335 each include a cuff 340 (shown in FIG. 15) and a latch 345 rotatably connected to the cuff 340 (shown in FIG. 17). The latch 345 includes a protrusion 350 that is engagable with the detent member 310, a button 355 extending through an opening in the cuff 340, and a pivot point 360 located between the protrusion 350 and the button 355. More specifically, the first adjustment mechanism 330 includes a latch 345 that is engagable with the first detent member 310a positioned in the second telescoping member 285b (or a detent formed directly in the second telescoping member), and the second adjustment mechanism 335 includes a latch 345 that is engagable with the second detent member 310b positioned in the third telescoping member 285c (or a detent formed directly in the third telescoping member).

Springs 365 bias the latches 345 towards a locked position. In the locked position, the protrusion 350 of the latch 345 is engaged with a detent in the detent member 310 to inhibit the telescoping members 285 from translating in an axial direction relative to one another. To unlock the latch 345 and enable the telescoping members 285 to translate freely, an operator presses the button 355 on the latch 345 to rotate the latch 345 about the pivot point 360 against the biasing force of the spring 365. When the latch 345 rotates against the spring force, the protrusion 350 disengages from the detent and unlocks the telescoping members 285. When the operator releases the button 355, the spring 365 forces the latch 345 back to the locked position.

The first adjustment mechanism 330 and the second adjustment mechanism 335 can be used to vary the height of the light head 75 (i.e., adjusted in a linear direction). The light head 75 can also be adjusted to various orientations to direct light in various directions (i.e., adjusted in a rotational direction). More specifically, as shown in FIG. 20, the light head 75 is rotatably connected to the mast 70 by a hinge assembly 370. The hinge assembly 370 includes a first hinge 375 and a second hinge 380 that rotatably connect the light head 75 to the third telescoping member 285c. The first hinge 375 is rotatably connected to the third telescoping member 285c and the second hinge 380. The first hinge 375 defines a first axis 385 (e.g., the Y-axis) that extends along the length of the mast 70. The first hinge 375 enables the light head 75 to rotate about the first axis 385. In some embodiments, the first hinge 375 enables the light head 75 to rotate between 180 degrees and 360 degrees about the first axis 385. In the illustrated embodiment, the first hinge 375 enables the light head 75 to rotate about 240 degrees about the first axis 385. The second hinge 380 rotatably couples the light head 75 to the first hinge 375. The second hinge 380 defines a second axis 390 (e.g., the X-axis) that is perpendicular to the first axis. The second hinge 380 enables the light head 75 to rotate about the second axis 390. In some embodiments, the second hinge 380 enables the light head 75 to rotate between 90 degrees and 270 degrees about the second axis 390. In the illustrated embodiment, the second hinge 380 enables the light head 75 to rotate about 213 degrees about the second axis 390. Accordingly, the hinge assembly 370 enables the light head 75 to be adjusted about more than one axis.

In operation, an operator can carry the light 50 to a worksite when the light 50 is in a compact stowed configuration, as shown in FIGS. 2 and 3. When the light 50 is in the stowed configuration, the leg deploy mechanism 215 locks the legs 60 in the stowed configuration within the leg cradles 175 on the sides 100 of the base 55. Similarly, the light deploy mechanism 255 locks the light body 65 in the stowed configuration with the light head 75 received within the light cradle 170. In addition, the telescoping mast 70 is retracted. The operator can carry the light 50 from either the first handle 105 on the top side 100 of the light 50 or the second handle 110 on the side 100 of the light. When holding the light 50 from the second handle 110, the operator can use the light 50 as a flashlight to help navigate the path to the worksite.

Once at the worksite, an operator can expand the light 50 into one of the open configurations. To do this, an operator presses on the leg deploy mechanism 215 to release the legs 60 from the locked and stowed configuration. When the actuator 220 of the leg deploy mechanism 215 is pressed, the legs 60 can be rotated to the tripod configuration or to the platform configuration. To lock the legs 60 in one of the open configurations, the operator releases the actuator 220 so that the pins 235 of the leg deploy mechanism 215 engage with a bore 240 in the legs 60. In particular, the pins 235 will engage with a bore 240 corresponding to the specific open configuration desired (e.g., the tripod configuration or the platform configuration). The operator can also adjust the light body 65 to the open position using the light deploy mechanism 255. Specifically, the operator slides the sleeve 260 against the spring bias to disengage the hook 265 from the notches 270 in the rotatable coupling. Once detached, the operator can rotate the light body 65 until the hook 265 is aligned with the notch 270 corresponding to the open configuration desired. Releasing the sleeve 260 will automatically lock the light body 65 in the desired open configuration due to the springs 272 biasing the sleeve 260 towards the locked position.

If the operator desires the light body 65 to be taller, the operator can expand the telescoping mast 70 using the first adjustment mechanism 330 and/or the second adjustment mechanism 335. The operator can orient the light head 75 toward the area that needs to be illuminated by rotating the light head 75 about the two hinges 375, 380 that are on two different axes 385, 390.

Accordingly, the invention provides an area light that can be used in a plurality of different orientations. The user can use the light in a stowed configuration similar to a flashlight or can use the light in any one of the open configurations as a stand light. In addition, the light can be adjusted to different heights via the telescoping members and directed in different directions via the hinges.

The embodiment described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:

1. An area light, comprising:
   a base having a first end and a second end;
   a pair of legs rotatably coupled to the first end of base, wherein the pair of legs is rotated towards the base when the area light is in a stowed configuration and is rotated away from the base when the area light is in a first open configuration and a second open configuration;
   a light body having a light head, the light body being rotatably coupled to the base on the first end of the base, wherein the light body is rotated towards the base when the area light is in the stowed configuration and is rotated away from the base when the area light is in the open configuration; and
   a leg deployment mechanism including an actuator and a locking mechanism, the locking mechanism being engagable with the pair of legs to selectively prohibit rotational movement of the pair of legs relative to the base, and the actuator being actuable to disengage the locking mechanism such that the pair of legs is rotatable relative to the base when the actuator is actuated,
   wherein each leg of the pair of legs includes a first edge, a second edge opposite the first edge, and a foot between the first edge and the second edge, and wherein the first edge of each leg is engagable with a support surface when in the stowed configuration, the second edge of each leg is engagable with the support surface when in the first open configuration, and the foot of each leg is engagable with the support surface when in the second open configuration.

2. The area light of claim 1, wherein the locking mechanism is configured to maintain the pair of legs in a plurality of rotational positions relative to the base.

3. The area light of claim 1, wherein the locking mechanism includes a pin that is selectively received within a bore on one of the pair of legs to prohibit rotational movement of the one of the pair of legs relative to the base.

4. The area light of claim 3, wherein the pin is received within the bore when the locking mechanism is in a locked position, wherein the pin is removed from the bore when the actuator is actuated, and wherein the locking mechanism is biased towards the locked position.

5. The area light of claim 1, wherein the locking mechanism is a first locking mechanism that is engagable with one of the pair of legs, and wherein the leg deployment mechanism further includes a second locking mechanism that is engagable with the other of the pair of legs.

6. The area light of claim 5, wherein the actuator is actuable to simultaneously disengage the first locking mechanism and the second locking mechanism.

7. The area light of claim 1, further including a flexible connector extending between the pair of legs to rotate the pair of legs together as a single unit relative to the base.

* * * * *